Sept. 29, 1964 C. ALLANDER 3,150,584
AIR-CONDITIONING ARRANGEMENT FOR OPERATING ROOMS
Filed Oct. 3, 1962
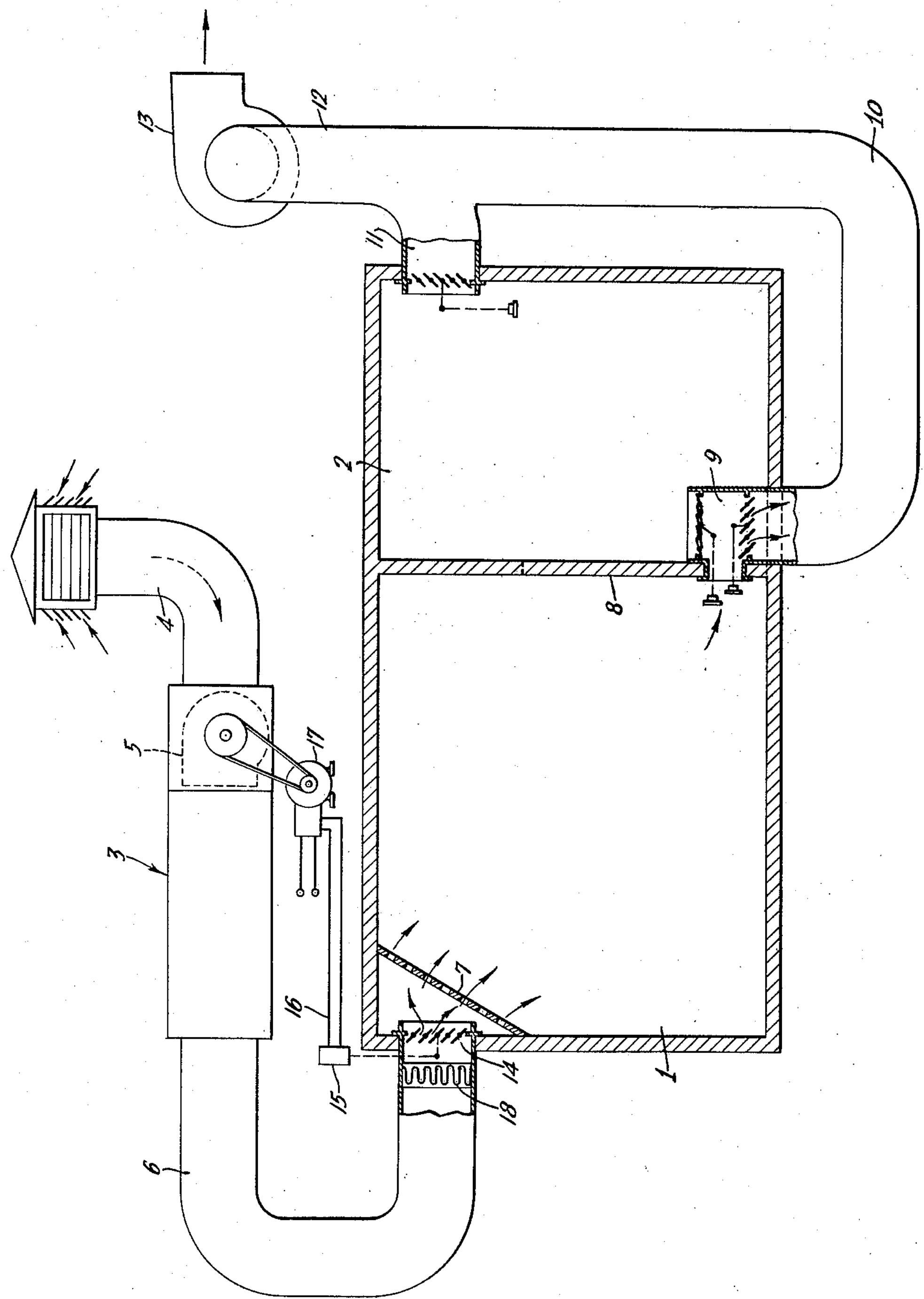
INVENTOR.
CLAES ALLANDER
BY Howson & Howson
ATTYS.

United States Patent Office 3,150,584

Patented Sept. 29, 1964

3,150,584

AIR-CONDITIONING ARRANGEMENT FOR OPERATING ROOMS

Claes Allander, Bromma, Sweden, assignor to Aktiebolaget Svenska Flaktfabriken, Stockholm, Sweden Filed Oct. 3, 1962, Ser. No. 228,172
3 Claims. (Cl. 98—33)

The present invention relates to an arrangement for the ventilation and air-conditioning of operating rooms or theatres and similar premises where there are considerable demands for pure air by the supply of air treated in an air-conditioning apparatus. Various measures are adopted when operating to reduce the risks of infection. Lately there has also been a pronounced demand for air free of bacteria. Bacteria contained in the air in operating theatres should not exceed 2 bacteria colonies per cubic foot. The climatic condition of the operating theatre is also of great importance. The installations should therefore be given such a capacity that the condition of the air in the operating theatre can be maintained at a constant level even in the case of exceptional outside air and heat condition. The installation should be capable of holding a temperature of 20 centigrades plus or minus 1 centigrade and a relative humidity of 60% plus or minus 2% units.

The invention, with the purpose of ensuring the above demands, is characterized in that the air is conducted from above diagonally down through the operating theatre by being supplied at an angle between the ceiling and one of the walls of the theatre and evacuated at the floor adjoining the opposite wall whereby the amount of evacuated air is kept somewhat lower than the amount of air supplied. The air to be treated is conducted under positive pressure through the conditioning apparatus by placing the necessary blower in front of apparatus and, in case the blower is stopped, closing the air supply thus preventing back-draught and the risk of contaminating the air-conditioning apparatus and the channels connected to same by placing an automatically operated, tight-closing draught valve immediately in front of the air supply point.

By placing the evacuation apertures at floor lever on the opposite side of the operating theatre a diagonal stream is obtained in the operating theatre which prevents the concentration of heavier gases along the floor and air which has swept along the floor, from contacting the patient.

The air is evacuated via a fore-room acting as a lock-chamber to the operating theatre. Ventilation should be be maintained even if no operation takes place, by having the blower or blowers running at a reduced but stiff sufficient speed to prevent back-draught.

Cleaning of the air from dust and similar particles is achieved by a fine filter, e.g. what is commonly referred to as an obsolute filter which removes extremely fine particles, placed as near as possible to the operating theatre but considered from the direction of the air flow ahead or upstream of the above mentioned closing valve.

The invention will now be described more in detail in connection with the accompanying drawing which shows an arrangement for the ventilation and air-conditioning of an operating theatre in accordance with the invention.

In the drawing 1 indicates an operating room or theatre and 2 a fore-room acting as a lock-chamber to the operating theatre. 3 indicates an air-conditioning apparatus for the treatment of air supplied via a channel 4 by means of a centrifugal blower 5. The air is conducted through an air-conditioning apparatus in which it is given the desired condition, implying a high degree of purity and the intended values of temperature and humidity. These values are for the temperature 20 centigrades plus or minus 1 centigrade and for the relatively humidity 60% plus or minus 2% units. 6 indicates a channel leading from the conditioning apparatus 3, and 7 indicates an obliquely placed, perforated air distributing screen. The air is conducted through this screen diagonally from above and down to be evacuated at floor level at the opposite wall 8. The operating theatre is under positive pressure all the time because the amount of evacuated air is kept somewhat lower than the amount of air supplied. The air is led under positive pressure through the conditioning apparatus 3 by placing the required blower 5, in this case a centrifugal blower, in front of the apparatus. The air to be evacuated can be conducted either through a suction aperture 9 leading into an evacuation channel 10 or through an evacuation aperture 11 in the ceiling of the fore-room connected to the suction channel 12, or it can be exhausted through both these apertures with a determined proportion between the amounts to be exhausted. 13 indicates a blower for the air to be evacuated, and fitted in channel 12 to which also channels 10 and 11 are connected. By means of an appropriate control of the apparatus provided by the invention, ventilation may be maintained by having the blower or blowers running at a reduced but still sufficient speed to avoid back-draught. 14 indicates an automatically operated, tight-closing draught valve fitted immediately in front of the air-supply point, i.e. the obliquely placed screen 7 which valve, in case of stoppage of the air supply blower (operated by motor 17), closes the air supply channel thus preventing back-draught and the risk of contaminating the air-conditioning aggregate 3 and the channels 6 connected to same. The draught valve 14 is actuated by a valve motor 15 which is controlled via the line 16 from the motor 17 of the air supply blower 5. 18 indicates a fine filter, in which the air is finally cleaned from dust and undesirable particles carrying bacteria. This filter should be placed as near as possible to the operating theatre but considered from the direction of the air flow ahead of the closing valve 14. It is assumed that the fore-chamber acting as a lock-chamber, to the operating theatre, is connected with the operating theatre by means of electrically intercontrolled doors so that only one door at a time can be opened to the operating theatre and to one of the corridors outside the fore-chamber. The intercontrol may, if desired, be short-circuited for the purpose of transporting patients to and from the operating room but this should of course not occur during an operation. By maintaining an air withdrawal arrangement within the lock-chamber (fore-chamber) surplus air from the operating theatre and air possibly leaking in from the corridors is exhausted via the lock-chamber. This ensures that infected air from the corridors is prevented from entering the operating theatre.

What I claim is:

1. An arrangement for the ventilation and conditioning of air in an operating room, comprising in combination, an operating room, a lock chamber for the operating room located at a first sidewall thereof with a closure-controlled opening in the sidewall, air conditioning apparatus, air supply means including a supply duct embracing said air conditioning apparatus and having an air supply opening at the top of a second sidewall of the operating room distant from said first sidewall, said air supply means including a blower connected with the outer end of said supply duct for blowing air through said air conditioning apparatus, air exhaust means for said operating room including an air exhaust opening in and near the bottom of a sidewall distant from said second sidewall, the air supply opening and the air exhaust opening being diagonally oppositely arranged and being the only air flow openings whereby to force air to flow diagonally across the room, said air exhaust means being of smaller capacity than said air supply means to maintain a super-atmospheric pressure in the operating room, an air flow control device provided in said air supply duct at said air supply opening, means for closing said flow control device upon the cessation of air flow to the operating room from said air supply means, and means for passing at least a part of the air from said exhaust opening through said lock chamber.

2. An arrangement as set forth in claim 1, in which said air conditioning apparatus includes a fine filter located in said air duct immediately upstream ahead of said flow control device.

3. An arrangement as set forth in claim 1, which includes means for selectively passing all the air from said exhaust opening through said lock chamber or to another point and for selectively proportioning the flow of air to said lock chamber and said other point.

References Cited in the file of this patent

UNITED STATES PATENTS

| | | |
|---|---|---|
| 1,600,522 | Strehlke | Sept. 21, 1926 |
| 1,792,514 | Spear | Feb. 17, 1931 |
| 2,335,173 | Corey | Nov. 23, 1943 |